Patented Apr. 30, 1929.

1,711,219

UNITED STATES PATENT OFFICE.

SAMUEL JAMES MANSON AULD, ALBERT ERNEST DUNSTAN, AND PERCY HENRY HERRING, OF SUNBURY-ON-THAMES, ENGLAND, ASSIGNORS TO ANGLO-PERSIAN OIL COMPANY, LIMITED, OF LONDON, ENGLAND.

APPARATUS FOR THE TREATMENT OF LIQUID HYDROCARBONS.

Application filed February 11, 1924, Serial No. 692,063, and in Great Britain February 20, 1923.

This invention relates to apparatus for use in the pressure cracking of liquid hydrocarbons, comprising a furnace and flue setting therefor.

The invention is especially applicable in the carrying out of a single cycle type of pressure cracking process described in the specification filed pursuant to a co-pending application Serial No. 692,062, dated February 11th, 1924.

According to the invention the apparatus and setting are so constructed that heat may be gradually and uniformly applied to thermalizing tubes of determined length through which the oil to be treated is passed before it issues to a reactor.

The invention involves the constructional features hereinafter described.

The invention is illustrated in the accompanying drawing in which

Figure 1:
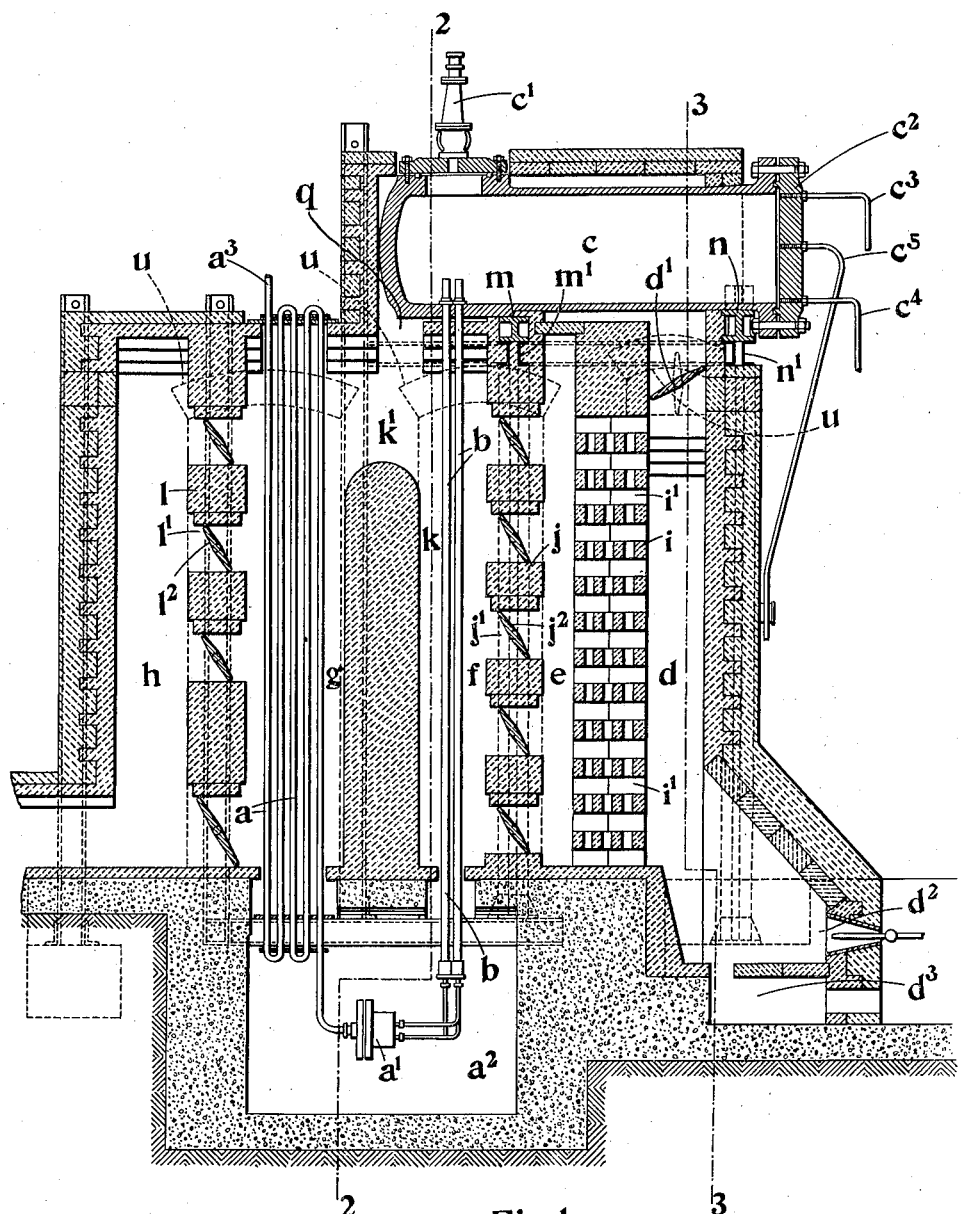
Figures 2, 3:
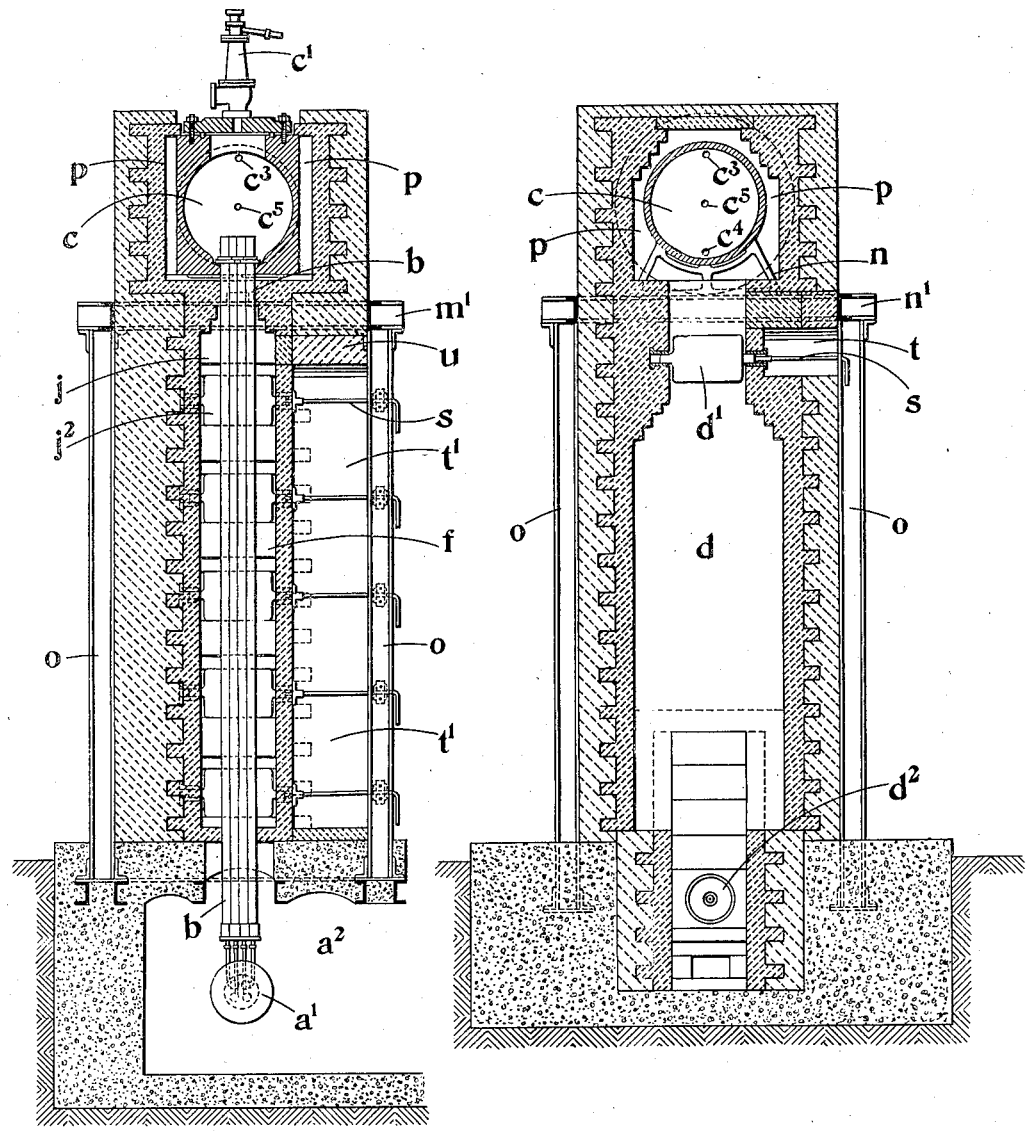
Figure 4:
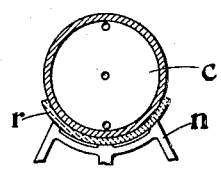

Figure 1 is a longitudinal sectional elevation, Figures 2 and 3 are cross-sectional elevations on the lines 2—2 and 3—3 Figure 1, and Figure 4 is a cross-sectional elevation corresponding to Figure 3 of a modification in detail.

In carrying the invention into effect, the apparatus comprises a pre-heater $a$, and a number of separate thermalizing tubes $b$ respectively mounted in vertical position within adjacent and communicating vertical flues $f$, $g$, and a reactor $c$ surmounting the thermalizing tubes $b$ and to which the upper ends thereof are connected, so that the oil may successively pass through the pre-heater $a$ and thermalizing tubes $b$, and thence into the reactor $c$.

The pre-heater $a$ may be formed of a continuous tube of one inch internal diameter in a number of parallel vertically disposed lengths each for example of over 10 feet in length, and at its lower end may be connected to a casing $a^1$ disposed in a chamber $a^2$ accessible from without as indicated in Figure 2 and separate from and beneath the flues $f$, $g$, and into which casing the pre-heated oil may flow, and to which casing the lower ends of the thermalizing tubes $b$ are respectively connected. The thermalizing tubes $b$ may be four in number, and of an internal diameter of one and a half inches, and they may be exposed to the heating gases which traverse them, for about ten feet of their length. At their upper ends they may be secured beneath and at the rear end of the reactor $c$, which is advantageously of cylindrical form, having for example a length of approximately eight and a half feet and a diameter of two and a half feet. The reactor is advantageously supported upon transversely disposed cradles $m$ $n$ carried upon joists $m^1$ $n^1$ respectively supported by pairs of pillars $o$ $o$. The reactor $c$ is provided at its upper part with a safety valve $c^1$, and at the rear is closed, while at the front it may be open, and have applied upon it a cover plate $c^2$, to which is secured the end of an outlet pipe $c^3$, which is accessible to the liquid in the upper part of the reactor $c$, and through which any vapour formed may thus pass outwardly with the liquid, and the outlet pipe $c^3$ may be provided with a suitable controlling valve. The reactor may, however, be provided with an upward extension or dome, in a central or other position to which the outlet pipe may be secured, so as thus to ensure that any vapour and gas formed are always accessible to the outlet pipe.

The reactor $c$ may also conveniently be provided with an outlet pipe $c^4$ at the lowermost part of the reactor $c$ under the control of a valve, by which the accumulation of carbonaceous matter may be periodically withdrawn, while an outlet pipe $c^5$ also under the control of a valve may be provided in a middle position.

The reactor $c$ is so mounted in the setting that its upper part and sides may be heated by the heating gases, so that the temperature within the reactor may be maintained at the determined degree. For this purpose the heating gases may pass upwardly from a vertical flue $d$ disposed near the front of the setting under the control of a pivoted valve or damper $d^1$, the heating gases passing from the upper end of this flue $d$ through the flue $p$ on each side of and above the reactor $c$ towards its rear end, and downwardly through the central and vertically disposed port or passage, and thence through the central and laterally disposed port or passage $k^1$ and thence into the vertical flue $g$ in which the pre-heater $a$ is mounted.

The under-part of the reactor $c$ may advantageously be provided with an insulation $r$, as diagrammatically indicated in Figure 4, which may take the form of insulating brickwork interposed between the reactor and the setting and between the reactor and the vertical flues $d$, $e$ and $f$, with a view to prevent or minimize the transmission of heat to the carbonaceous matter that in the treatment is slowly deposited on the lower part of the reactor $c$, and thus to avoid the coking of this carbonaceous matter, that would otherwise result as a consequence of the application of heat to the lower part of the reactor.

Heat may be applied to the apparatus in the combustion of liquid fuel, and in the use of liquid fuel burners disposed within a combustion chamber $d^2$ at the lower end of the front vertical flue $d$, and secondary air for the burners is supplied through the air passage $d^3$. The transverse wall $i$ on the inner side of the flue $d$ is constructed of open refractory brickwork by which horizontal passages $i^1$ are provided, through which the heating gases from the flue $d$ pass into the adjacent vertical flue $e$ upon its other side, while the setting may be so constructed that another transverse wall $j$ is formed between the transverse wall $i$ aforesaid and the flue $f$ within which the thermalizing tubes $b$ are mounted. Within the wall $j$ apertures $j^1$ are provided in which valves or dampers $j^2$ are pivotally mounted, by which the heating gases that pass across and up the flue $f$ in which the thermalizing tubes $b$ are set, may be regulated.

A solid transverse wall $k$ may be provided in the setting in a position between the pre-heater $a$ and the thermalizing tubes $b$, to extend short of the top of the setting, so as to form the lateral port or passage $k^1$ through which the heating gases after passing upwards and across the thermalizing tubes $b$, may pass into the upper end of the vertical flue $g$ in which the pre-heater $a$ is mounted. The uppermost valve or damper $j^2$ is advantageously disposed in direct line with the lateral passage $k^1$. A transverse wall $l$ may be provided and disposed in position on the other side of the pre-heater $a$, and a number of apertures $l^1$ may be formed therein for the reception of pivotally mounted valves or dampers $l^2$ for the regulation of the distribution of the heating gases into the adjacent vertically disposed outlet flue $h$. The lowermost valve or damper $l^2$ is advantageously disposed in direct line with the horizontal part of the outlet flue $h$.

The reactor $c$ is enclosed within the setting and the lining of the upper part of the setting enclosing the reactor as well as the lining of the front end and side walls of the setting, are constructed of firebrick, as are also the transverse walls $i$, $j$, $k$ and $l$.

The valves or dampers $d^1$, $j^2$ and $l^2$ are so constructed that their respective spindles $s$ extend externally of the setting and are provided with handles by means of which they may be set into determined position as may be required in operation. In the illustrated construction the external wall of the setting is interrupted at the positions at which the valves or dampers are mounted and at these positions the upper part of the side wall is supported by arches $u$. Cavities $t$ $t^1$ are thus formed, which may be filled in with any suitable filling material.

By the operation of the series of dampers $j^2$, the application of heat to the thermalizing tubes $b$ is regulated, so that the oil in passing up the relatively short thermalizing tubes $b$ is gradually and uniformly heated, and thus the local over-heating of the tubes and the consequent premature decomposition of the oil is avoided. The series of dampers $l^2$ have a similar purpose in avoiding the overheating of the pre-heater $a$.

The valve or damper $d^1$ may serve the purpose of preventing access of the heating gas from the flue $d$ to the flue $p$. Thus it will be understood that the upper part of the setting enclosing the reactor may serve as an insulation therefor and the reactions therein may if and when desired, proceed without the application of heat to the reactor.

The final temperature to which the oil is heated in its passage through the thermalizing tubes $b$ is so determined according to the method of the said co-pending application, that the oil in its flow at relatively low velocity through the tubes $b$ is uniformly heated substantially beyond the determined degree of eventual cracking within the reactor $c$. Similarly heat is uniformly applied to the pre-heater $a$ to within for example not less than about 25° C. of the determined temperature of cracking under conditions in which the over-heating of the oil within the pre-heater $a$ is also avoided.

Inasmuch as the effective treatment according to the method of the said co-pending application is dependent upon the precise determination of the conditions of temperature, a pyrometer is advantageously employed, whereby the temperature of the oil in a number of positions in the length of the thermalizing tubes is recorded, so that thus the application of heat and the temperature of the oil may be precisely indicated and determined. Similarly the temperature of the oil in a number of positions in the pre-heater and in the reactor may also be recorded for the same purpose.

It will be understood that the oil is fed at $a^3$ to the pre-heater $a$ by a pump at a determined rate of feed, and that a pressure is thus maintained upon the oil in its course through the pre-heater $a$, thermalizing tubes $b$, reactor $c$ and cooler, which pressure rises to the substantially constant degree at which the treatment is to be carried out.

It will further be understood that the thermalizing tubes $b$ having a small diameter or width of cross-section, when externally heated have a very low cross-sectional temperature gradient. Thus in order to obtain particular final temperatures of the oil stream within the thermalizing tubes, the actual furnace temperature or the temperature of the heating gases may be very little higher. These conditions make for the avoidance of an excessive temperature of the oil, while the relatively short length of the thermalizing tubes permits of effective control of the heating gases in traversing them.

In the use of the apparatus described for carrying out the single cycle type of pressure cracking method of the said co-pending application, the yield of light products is limited whereby the products of cracking within the reactor are as far as possible maintained dissolved in the liquid and the total yield of light products and of unsaturated compounds limited under relatively low or moderate temperatures of cracking. Thus the capacity of the reactor $c$ is determined having regard to the relatively slow rate of flow through the thermalizing tubes and the maintenance of the liquid in the reactor for such a length of time that cracking to the extent required is completed. This in general is effected in the apparatus described within a period of about two hours where the extent of yield of light products is relatively low or moderate and where the rate of flow through the thermalizing tubes of such dimensions as hereinbefore indicated is about two feet per minute. It will be understood, however, that the time factor may to some extent be varied in the use of the same apparatus by variation in the rate of flow, and that the determined mean temperature of cracking may also be varied within restricted limits while carrying out the method described.

In the treatment of heavy oils from 10% to 15% of gasoline having an end boiling point of 175° C. may for example be produced under the conditions described, in addition to a proportionate amount of kerosene, and a pressure such for example as from 350 to 450 pounds per square inch may be maintained, so that the gases and vapours are for the greater part kept dissolved in the oil, while from other stocks higher yields may be secured.

Thus it will be understood that in the treatment the oil is continuously fed through the apparatus and continuously withdrawn through the reactor. The oil from the reactor may flow through a cooler in which the same pressure is maintained, and may thence be discharged through a release valve into a gas separator which may consist of a vertically disposed cylinder, through which the gas and treated liquid may respectively be withdrawn. It will be understood that carbon is deposited in a loose condition on the walls of the reactor and may be periodically withdrawn.

We claim:

1. An apparatus for use in the pressure cracking of liquid hydrocarbons, comprising a pre-heater, a plurality of separate and relatively short thermalizing tubes into which the liquid passes from the pre-heater, a reactor surmounting the thermalizing tubes and into which the liquid issues therefrom, a setting within which the said elements are mounted, the setting comprising a flue within which the thermalizing tubes are disposed, and means for the regulation of the application of heat to the said thermalizing tubes, comprising a wall adjacent the said flue, a series of valves within the said wall, and means for the operation of the said valves externally of the setting, substantially as described.

2. An apparatus for use in the pressure cracking of liquid hydrocarbons, comprising a pre-heater, a plurality of separate thermalizing tubes into which the liquid passes from the pre-heater, a reactor of relatively large area surmounting the said thermalizing tubes and into which the liquid discharges therefrom, a setting comprising substantially vertical flues within which the said pre-heater and the said thermalizing tubes are respectively mounted, means for regulating the application of heat to the said pre-heater and thermalizing tubes respectively comprising a wall forming part of the setting, a series of valves within the said wall, said series of valves extending the length of the said flues, and means external to the setting for the operation of the said valves, substantially as described.

3. An apparatus for use in the pressure cracking of liquid hydrocarbons, comprising a pre-heater, a plurality of separate thermalizing tubes into which the liquid passes from the said preheater, a reactor surmounting the said thermalizing tubes and into which the liquid issues therefrom, a setting for the said elements comprising a combustion chamber, a flue in communication therewith through which the heating gases pass from the said combustion chamber, a flue surmounting the setting, within which flue the said reactor is mounted, said flue communicating at one end with the flue first referred to and at the other having an outlet discharging into another flue in the setting, and a valve controlling the passage of the heating gas from the flue first referred to to the flue in which the reactor is mounted, substantially as described.

4. An apparatus for use in the pressure cracking of liquid hydrocarbons, comprising a plurality of separate and substantially vertically disposed thermalizing tubes, a reactor surmounting the said thermalizing tubes and to which the upper ends thereof are connected and into which the liquid flows on issuing from the said tubes, a setting within which said elements are mounted, said setting comprising a combustion chamber, a substantially vertical flue in communication therewith, a transverse and substantially vertically disposed wall constructed of open brickwork forming passages communicating from one side of the wall to the other, a wall adjacent and parallel with that last referred to separated therefrom by a vertical flue, a series of valves therein, and a substantially vertical flue adjacent the said wall within which the said thermalizing tubes are mounted, substantially as described.

5. An apparatus for use in the pressure cracking of liquid hydrocarbons, comprising a pre-heater, a plurality of separate thermalizing tubes into which the liquid passes from the said pre-heater, a reactor surmounting the said thermalizing tubes and into which the liquid issues therefrom, and a setting comprising a combustion chamber, flues in the said setting in communication therewith within which the said pre-heater and thermalizing tubes are respectively disposed, a flue within which the said reactor is mounted, and means respectively by which the application of heat to the pre-heater and thermalizing tubes may be regulated, substantially as described.

6. An apparatus for use in the pressure cracking of liquid hydrocarbons, comprising a pre-heater, a plurality of separate thermalizing tubes into which the liquid passes from the said pre-heater, a reactor surmounting the said thermalizing tubes and into which the liquid issues therefrom, a setting comprising a combustion chamber, flues in the said setting in communication therewith within which the said pre-heater and thermalizing tubes are respectively disposed, a flue within which the said reactor is mounted, means respectively by which the application of heat to the pre-heater and thermalizing tubes may be regulated, and means by which the application of heat to the reactor may be regulated comprising a valve within a flue extending directly from the combustion chamber, substantially as described.

7. An apparatus for use in the pressure cracking of liquid hydrocarbons, comprising a pre-heater, a plurality of separate and substantially vertically disposed thermalizing tubes into which the liquid passes from the pre-heater, a reactor surmounting the thermalizing tubes and into which the liquid issues therefrom, and a setting for the said elements comprising transversely disposed walls respectively in front of the thermalizing tubes and at the rear of the pre-heater, within which walls a series of valves are provided for the control of the distribution of the heating gases traversing the respective pre-heater and thermalizing tubes, substantially as described.

8. An apparatus for use in the pressure cracking of liquid hydrocarbons, comprising a pre-heater, a casing into which the liquid from said pre-heater is discharged, a plurality of separate and relatively short thermalizing tubes into which the liquid passes from the said casing, a reactor of relatively large area surmounting the said thermalizing tubes and into which the liquid issues therefrom, and a setting within which the said elements are mounted, the said setting comprising a chamber separate from the flues of the setting within which the said casing is mounted, substantially as described.

SAMUEL JAMES MANSON AULD.
ALBERT ERNEST DUNSTAN.
PERCY HENRY HERRING.